Feb. 4, 1936. W. PORTEOUS 2,029,540
TRAILER
Filed Oct. 1, 1935
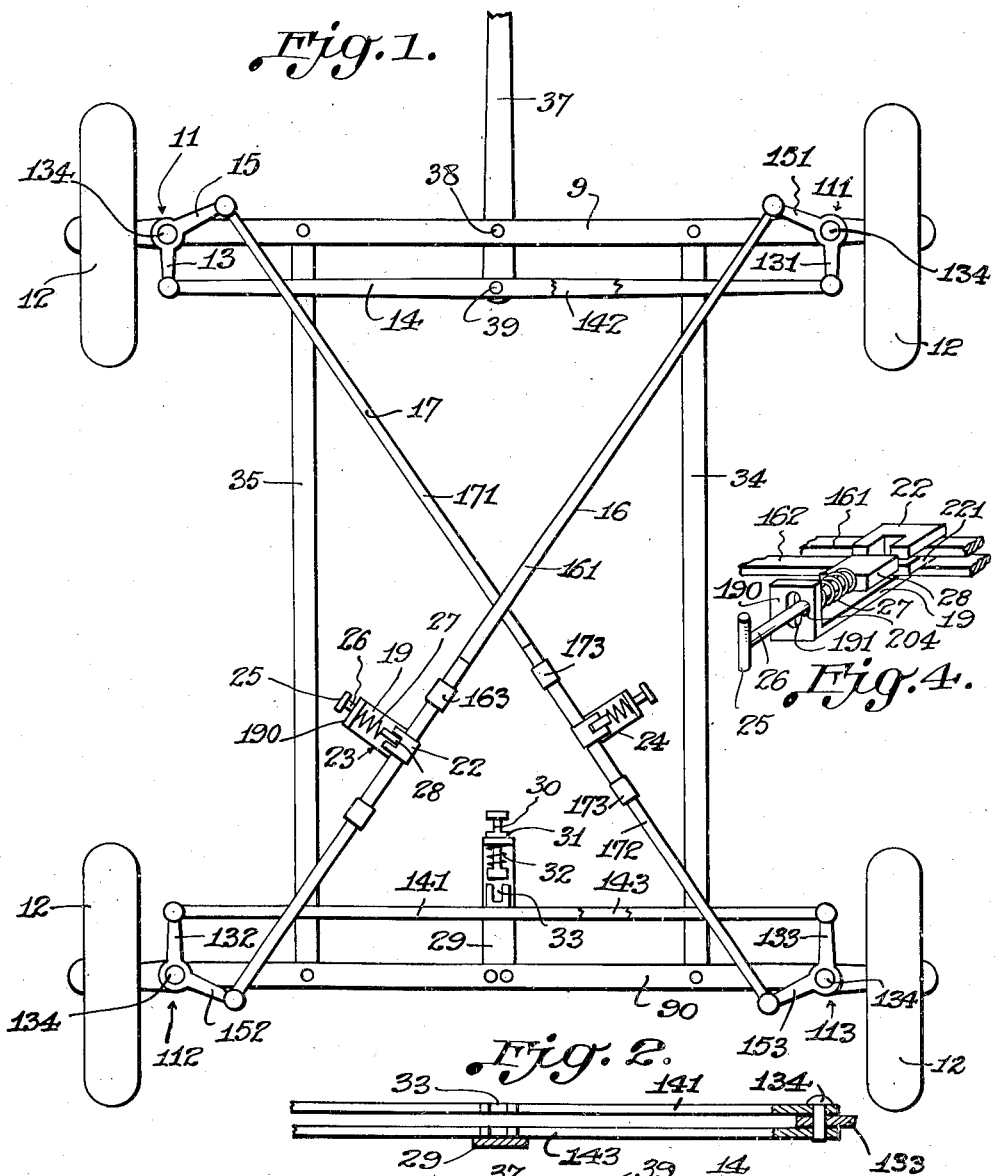
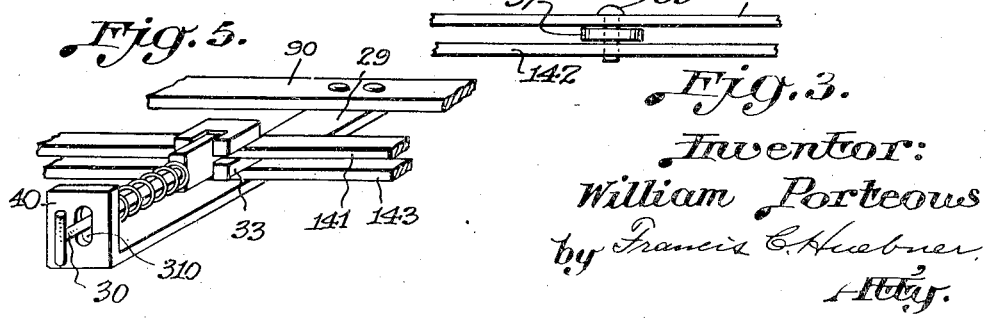
Inventor:
William Porteous
by Francis E. Huebner
Atty.

Patented Feb. 4, 1936

2,029,540

UNITED STATES PATENT OFFICE 2,029,540

TRAILER

William Porteous, Fresno, Calif.

Application October 1, 1935, Serial No. 43,042

2 Claims. (Cl. 280—103)

My invention relates to a combination vineyard truck and a road vehicle. The trucks commonly used in vineyards and orchards comprise a front and a rear axle, each of which is pivotally mounted at the approximate lateral center of the axle, to a frame which supports the bed or platform. The axles are connected with cross reaches which are pivotally connected to said axles. One of said reaches extends from the right end of the front axle to the left end of the rear axle, and the other reach extends from the left end of the front axle to the right end of the rear axle. The spindles carrying the wheels are aligned with and are integral with said axles. The object in this type of truck is to have the rear wheels in turning describe practically the same curve as is described by the front wheels. A vehicle in which the rear wheels swivel synchronously with the front wheels has a distinct advantage when used in a vineyard or orchard planted in rows, and where short turns are required. When a vehicle thus constructed is driven at a rate of speed greater than what might be termed slow speed, the rear of the vehicle will weave or whip from side to side. The greater the speed the more the truck will weave. It is advantageous to use a truck in a vineyard or orchard to gather the boxes of fruit and then to transport the fruit on the truck direct to the packing house over public roads, and at a faster speed than is desired in the vineyard. This is impossible with the vineyard trucks I have above described.

The object of my invention is the construction of a vehicle which can be used as a vineyard truck by having the rear wheels swivel synchronously with the front wheels when turned to the left or to the right, and in which the swivel mechanism on the rear axle assembly can be interlocked so the same vehicle can be used on the public road and with greater speed than when used in the vineyard. Other objects will be hereinafter disclosed.

These objects are accomplished by means of the device hereinafter described and illustrated on the accompanying drawing in which Fig. 1 shows a top plan view of the chassis of the vehicle with my invention incorporated therein. Fig. 2 is a fractional view of the rear tie rod as viewed from the front of the vehicle. Fig. 3 is a rear view of the front tie rod. Fig. 4 is an enlarged side view of the device for interlocking the parts of the cross reach together. Fig. 5 is a side view of the device for holding the rear spindles rigid with the axle.

In the drawing herewith the front axle of the vehicle is designated 9, and the rear axle 90. Each end of each axle is provided with a spindle, designated 11, 111, 112 and 113, which spindles are adapted to rotatingly carry wheels 12. These spindles are pivotally mounted on the axles by pivots 134. Each spindle has an arm formed integrally therewith, said arms extending at approximately right angles to the spindle, and radially from the pivots 134. These arms are designated 13, 131, 132, and 133. A tie 14 connects arms 13 and 131 which are assembled with the front spindles, and a tie 141 connects arms 132 and 133 which are assembled with the rear spindles. These ties are pivotally connected with the arms and are made preferably of two strips of metal positioned parallel, shown more clearly in Figs. 2 and 3, and designated on the drawing as 14 and 142 on the front axle, and 141 and 143 on the rear axle. The purpose of these ties is to coordinate the movements of the spindles thus connected, thus coordinating the movement of the wheels carried by said spindles.

Auxiliary arms 15, 151, 152, and 153 are likewise attached to the spindles and extend radially from the pivots at obtuse angles from arms 13, 131, 132, and 133. A cross reach 16 is pivotally attached at one end to auxiliary arm 151, and at the opposite end to auxiliary arm 152, and a similar cross reach 17 is pivotally connected at one end to auxiliary arm 15, and at the other end to auxiliary arm 153. It is noted that the spindles diagonally disposed are thus connected with cross reaches 16 and 17.

Each cross reach is constructed of two parts which overlap, and are adapted to slide on each other. These parts are designated 161 and 162, and 171 and 172. One of the parts on each cross reach has guides 163, or 173 in assembled relation therewith, the guides being adapted to hold the parts in parallel relation with each other, but permitting the adjacent parts to slide with relation to each other. Means for interlocking at will the parts forming each cross reach, so that the cross reaches will function as a rigid beam, is provided as follows: A bracket 19 is attached to the under face of part 161 of reach 16. The free end of this bracket is upturned at approximately right angles to the main portion of the bracket, forming extension 190. An elongated hole 191 passes through extension 190, and through said hole lock bolt 26 can pass. Lock bolt 26 has a handle 25 at one end and engaging means 28 at the other end. To parts 161 and 162 of the cross reach 16 are firmly attached U members 22 and 221, the opening in said U members being adapted to register when the front and rear wheels are aligned. The interlocking of the parts forming the cross reach is accomplished by moving the parts so that the openings in the U members register, and then by moving lock bolt 26 so the engaging means enters said openings in the U members. When so locked, parts 161 and 162 are held rigid with relation to said parts. By means of spring 27, lock bolt 26 is held in normal engagement with the U members. When it is desired to hold the lock bolt in a disengaged position, the bolt is pulled out of engagement by using handle 25, and lugs 204 on the lock bolt are pulled through the elongated opening 191. The lock bolt is then given a quarter turn and said lugs 204 will engage the wall adjacent to hole 191, and keep the lock bolt from functioning.

Locking means 24 on cross reach 17 is constructed similarly to locking means 23, and functions in the same manner.

It is noted that when the parts forming the cross reaches are rigid with relation to each other, tie 141 on the rear of the vehicle should be free to function to be moved synchronously with tie 14.

A tongue 37 is pivotally attached by bolt 38 to the front axle 9. The end of said tongue extending rearwardly is pivotally attached to tie 14. By moving the tongue on an approximately horizontal plane it will be noted that the front wheels are likewise moved to the right or to the left, and cross reaches 16 and 17 will move the rear wheels to the right or to the left with the movements of the front wheels. This adjustment is desirable when the truck is being used in the vineyard or orchard, and is to travel slowly.

As heretofore explained, it is frequently necessary to use the vehicle as a trailer, or on the public road where a greater rate of speed is desirable. To adjust the truck for this purpose the rear spindles should be held in rigid alignment with the rear axle. This is accomplished by locking means somewhat similar in principle to the locking means used on the cross reaches. A bracket 29 is attached to the rear axle at approximately right angles thereto, said bracket extending forward beyond tie 141. The free end of this bracket is bent at approximately right angles to the main portion of the bracket. An elongated hole 310 in said bent up portion 31 permits lock bolt 30 to pass therethrough. U members 33 are attached to ties 141 and 143. When the spindles are aligned with the axle the openings in the U members 33 are aligned so that the end of lock bolt 30 can be dropped therein. A spring 32 normally holds the lock bolt engaged with the U members. Lock bolt 30 has lugs 31 thereon which lugs are adapted to pass through hole 310 when the lock bolt is disengaged, and by a quarter turn of the lock bolt the lugs will engage the wall of the bent up portion, and hold the lock bolt in nonengagement with the U members. When the rear spindles are thus locked, the locking members on the cross reaches should be disengaged so that when the front wheels on the truck swivel from right to left or vice versa, the parts composing the cross reaches will lengthen or shorten by sliding over each other. With the rear spindles thus locked, the truck can be used as an ordinary vehicle or trailer for road work or for faster traveling.

For the purpose of making the frame rigid with the axles I have connected the axles together with beams 35 and 36.

In the drawing the bed, or platform, and braces supporting the platform which is a well known feature of trucks, is not shown or claimed.

Having described my invention I claim as new and ask for Letters Patent:

1. In a vehicle having two axles held in parallel relation a spaced distance apart, a spindle pivotally attached at each end of each axle, said spindles being adapted to be swung on an approximately horizontal plane, an arm on each spindle disposed radially from said pivot at approximately right angles to the spindle, a tie pivotally attached at either end to the arms on the spindles assembled with the front axle and a separate tie similarly connecting the arms on the spindles assembled with the rear axle, auxiliary arms on said spindles extending radially from the pivotal center of the spindle and on obtuse angles to the arms thereon, cross reaches pivotally attached to and connecting the auxiliary arms on the spindles diagonally disposed on the truck chassis assembly, said cross reaches being formed of two overlapping parts normally adapted to slide one over the other, and means adapted to interlock said parts so as to form a rigid cross reach.

2. A device as described in claim 1, including means for interlocking the spindles with the rear axle when the spindles are aligned with said axle.

WILLIAM PORTEOUS.